June 9, 1964 G. A. PETERSEN 3,136,844
STRANDED CABLE JOINT
Filed Sept. 11, 1961

INVENTOR
Gerald A. Petersen
BY
Julian Caplan
attorney

United States Patent Office 3,136,844
Patented June 9, 1964

3,136,844
STRANDED CABLE JOINT
Gerald A. Petersen, Sunnyvale, Calif. (% Petersen Engineering Co., Inc., P.O. Box 490, Santa Clara, Calif.), assignor of one-half to Anita E. Petersen, Saratoga, Calif.
Filed Sept. 11, 1961, Ser. No. 137,180
2 Claims. (Cl. 174—90)

This invention relates to a new and useful improvement in pulling means for reconductoring and method of reconductoring. More particularly, the invention relates to the use of a connector between two electric transmission conductors whereby an old conductor may be used as a pulling cable in tension stringing reconductoring to pull the new conductor. More specifically, the wire cable cores of the two conductors are bared and spliced by means hereinafter explained and, at the same time, a stocking grip installed over the exterior of the conductors with the result that part of the strain is absorbed by the cores and part by the external strands of the conductor.

Tension stringing of electrical conductors is a new development whereby overhead lines are strung while maintaining the conductors in the air at all times to avoid damage to the conductors. Ordinarily, a pulling line of wire rope is attached to the leading end of the conductor and is then run through stringing sheaves attached to the cross-arms of the poles or towers. Any damage which may occur by reason of contact with the ground is absorbed by the pulling rope. The function of the pulling line is to pull the conductor through the stringing sheaves. In the course of the operation, a pair of bull-wheels is used, one at each end of the line. The conductor is wound from its reel through the tensioner bull-wheel which applies a braking force to the pulling of the conductor while the wire rope is rewound through a puller bull-wheel and then back onto its reel. The bull-wheel on the puller is equipped with power for turning with a force greater than the braking action at the other end of the line and if the equipment is properly operated the conductor never touches the ground at any time during the stringing operation. Thus damage to the conductor is avoided, which is of importance in that such damage results in corona loss and also sets up radio interference at high voltages. Further, the use of tension stringing avoids obstructions such as pre-existing power and telephone lines, roads, streets and railroad tracks which must be traversed by the line being strung. Accordingly, tension stringing is becoming increasingly more important in the construction of electrical transmission lines both for high voltages and for low voltages.

Another modern development in power transmission line stringing arises out of the fact that increased power loads require instalation of new conductors over the same right of way. A system of reconductoring is used wherein the pre-existing conductor, which is being replaced, is used in place of the wire rope heretofore mentioned to pull one or more new conductors. The new conductors may be of increased diameter. The present invention finds particular application in reconductoring.

A still further development in tension stringing is the use of conductors made up of a plurality of strands. A central core of wire rope is located at the center of the conductor and imparts increased tensile strength to the conductor. Surrounding the core is at least one layer of helically wound rods of conductive material, such as aluminum or copper. In acutal practice there are usually several layers of such rods all concentric with the steel core. The rods are relatively soft and easily damaged, and an important feature of tension stringing is to avoid such damage to the rods either by abrasion upon contact with the ground or by crushing or otherwise abrading the conductors during the pulling operation. The present invention is used in connection with conductors of the type herein mentioned.

The principal purpose of the present invention is to provide means whereby the pulling force of the stringing operation is absorbed both by the central wire rope core and by the exterior strands of the conductor and thereby a greater pulling force may be exerted than could be carried by the steel core, whereas the crushing force applied to the exterior of the conductor is not sufficient to damage the same. Where reconductoring is performed the conductor being removed is likewise protected in the same fashion so that the replaced conductor may be reinstalled in some new location in undamaged condition.

An important result of the present invention, therefore, is to enable the installer of the conductor to use tensions greater than could be sustained either by the steel core itself or by the rods on the exterior of the conductor. Correspondingly another feature of the invention is the fact that the conductor is not crushed or damaged, nor is the central core stretched beyond its elastic limit during the tension stringing.

Another advantage of the invention is the fact that the coupling may be rapidly installed and removed and that no unusual tools or equipment are required.

A still further advantage of the invention is the fact that the connector will pass around the bull-wheel without interference and hence does not interfere with normal tensioning operations. This result is achieved because the connector is not stiff through an extended length.

Another feature of the invention is the fact that it may be adapted for use with a variety of different sizes of conductors at either end and with different styles or types of conductors of the general type heretofore described and hence reduces the number of different connectors which must be stocked.

Other objects of the present invention will become apparent upon reading the following specification and referring to the accompanying drawings in which similar characters of reference represent corresponding parts in each of the several views.

Figure 1:
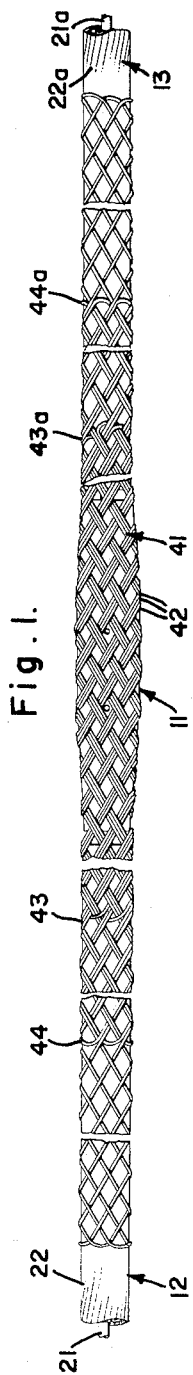
FIG. 1 is a side elevation of portions of a pair of conductors spliced together for tension stringing in accordance with this invention.
Figure 2:
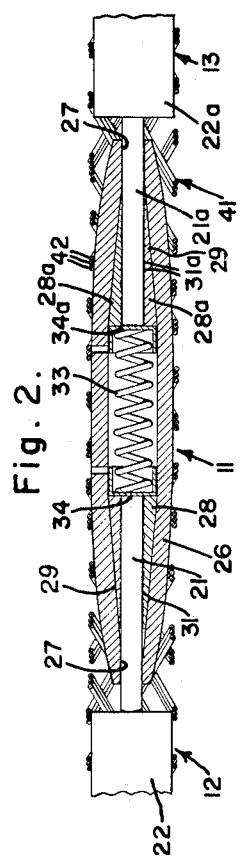
FIG. 2 is an enlarged, fragmentary, longitudinal sectional view through a portion of the structure of FIG. 1.

As shown in the accompanying drawings, there is provided a pulling connector 11 whereby a first conductor 12 may be used in tension stringing of a second conductor 13. Thus conductor 12 may be used in tension stringing of a second conductor 13. Thus conductor 12 may be a pre-existing conductor of low capacity to be replaced by a new conductor 13 of larger capacity in what is termed in the trade a "reconductoring" operation. Both conductors 12 and 13 are of essentially the same construction, although of different sizes. Conductor 12 has a central steel core 21 of several cabled strands of steel wire surrounded by helically layed layers of conductive rods 22, rods 22 ordinarily being patterned in several concentric rings. Preliminarily, strands 22 at the end of the conductor 12 are cut off leaving exposed a section of core 21. Corresponding parts of conductor 13 are given the same reference numeral followed by subscript "a."

The connector 11 has two parts, the first part comprising a splice-member, cigar-shaped casing 26 having an exterior which tapers inwardly at either end and having a hollow center, the walls of which likewise taper inwardly at either end. An opening 27 is provided in each end sufficient to receive core 21. It will be understood that the opposite ends of member 26 are preferably unequal in size so as to receive a large diameter cable at one end and a smaller diameter cable at the other. At each end a plurality of jaw members 28 is provided which are movable longitudinally of the inside of casing 26. The outside 29 of each jaw member 28 is externally tapered so that as the jaw moves toward the end of casing 26 it is forced inwardly. Each jaw member has a plurality of teeth 31 on its inside face which grip the cable with increased bite as the jaws move toward the end of the splice. A helical spring 33 is disposed in the interior of the splice and bears against cups 34 bearing against the ends of the jaws at opposite ends, initially biasing them into engagement with the cable. It will be apparent that the operation of this portion of the conductor is for practical purposes automatic in that the end of the core 21 is pushed into the opening 27 of the splice. Thereafter, movement of the splice relative to the conductor causes an increased bite of the teeth 31 of the jaws on the core, so that the greater the pull the more effective the grip of the splice on the cable. Reference is made to Patent No. 2,144,050 as showing a splice on which the present invention is an improvement. The jaws on both sides of the splice are similar, but preferably the size of such jaw members is different at each end.

Another means of connecting cables to a pulling means is the use of a cable grip known in the trade as a "Kellems" grip or stocking grip 41. Such a grip 41 is formed of reticulated wires 42 woven, as shown in the accompanying drawings, in helical patterns which intersect in diamond-shaped interstices. Preferably, the grip 41 comprises three or more strands 42 at its forward section, the third strand of each series of strands terminating at a position 43 spaced from the end and for another section of its length the grip is formed of two strands and at its remote end 44 of one strand. A preferred form of such a grip as illustrated herein is thick at the center and thinner at each end. Thus, at the center 42 the grip has three strands, the third terminating at either end thereof in positions indicated by reference numerals 43, 43a and for other sections at either end of the center is formed of two strands, the second strand terminating in positions at its outer ends indicated by reference numerals 44, 44a and outwardly thereof at the outer ends in single strands. The grip 41 is subject to variation in the number of strands and the number of sections of various numbers of strands. A feature of this type grip 41 is that an endwise pull in either direction tends to lengthen the grip and as it lengthens its construction causes a reduction in the internal diameter of the grip. Hence the greater the tension applied endwise to the grip the tighter it tends to grip the conductors over which it is installed. Another feature of this form of stocking cable grip is the fact that as the outer ends are formed toward the center the grip expands in internal diameter, permitting it to be slipped over the ends of conductors 12 and 13 and, more particularly, over the outer rods 22, 22a thereof. Release of the inward pressure causes it to contract and to engage the exterior faces of conductors 12 and 13. Pulling of the conductors apart then results in firmer attachment of the grip 41 to conductors 12, 13.

The pulling force applied to the pulling cable 12 is thus partially transmitted from core 21 to the interior of casing 26 of connector 11 and partially transmitted from rods 22 to the exterior of casing 26. From the interior of casing 26 the pulling force is partially transmitted to core 21a of pulled cable 13 and partially to rods 22a. Thus, a sufficient pulling force may be exerted for proper tension stringing, yet an excessive pull is not transmitted to stretch either core 21, 21a beyond its elastic limit or to crush same. At the same time, the full pull of the stringing operation is not transmitted to the exterior strands 22, 22a which might tend to crush or otherwise damage the same.

A method of reconductoring is achieved by the following steps. The rods 22, 22a of the pulling and pulled cables 12 and 13 are stripped back for short lengths, exposing cores 21, 21a in short lengths.

Next, grip 41 is slipped over splice casing 26 until the center strands 42 are over the casing 26.

The subsequent step is to push inward on one end of grip 41 to expand same to slip over the ends of rods 22, meanwhile inserting exposed core 21 in hole 27 and between jaws 28. Release of grip 41 causes it to grip rods 22 and jaws 28 grip core 21.

Next, push inward on the opposite end of grips to expand same to slip over the ends of rods 22a, meanwhile inserting the exposed core 21a in hole 27a and between jaws 28a. Release of grip 41 causes it to grip rods 22a and jaws 28a grip core 21a.

After the connections are made, the old conductor 12 is pulled with sufficient force to accomplish tension stringing and prevent the new conductor 13 from coming in contact with the ground or sagging against pre-existing wires, buildings, roadways, railroad tracks, highways, or the like. This method transmits the pulling force to the new conductor 13 and by means of well-known tension stringing equipment a pulling force is applied to the leading end of old conductor 12 which is greater than the braking action applied by tension stringing equipment to new conductor 13 as it is reeled off its reel.

Upon completion of the installation of the new conductor, the connections heretofore mentioned are removed by reverse operations.

Figure 3:
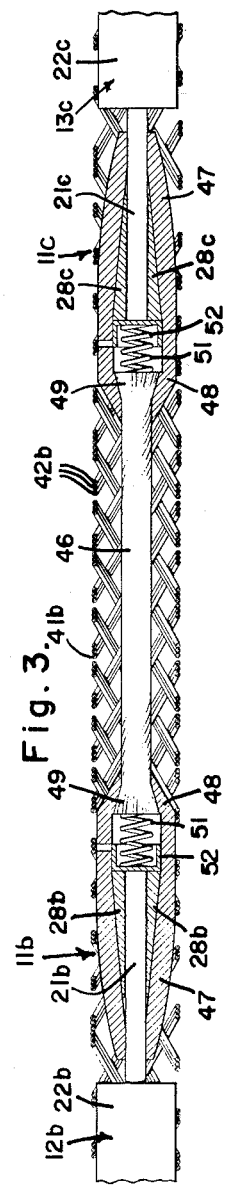
FIG. 3 is a view similar to FIG. 2 of a modification.

The modification shown in FIG. 3 has the advantage of greater flexibility which is of benefit when the connector passes around a bull wheel or is otherwise required to turn around a relatively short radius.

A first grip 11b and a second grip 11c are used, connecting the cores 21b, 21c of pulling conductor 12b and pulled conductor 13b, respectively. Grips 11b, 11c are interconnected by a short piece of wire cable 46, or some similar connecting means. In the form shown in FIG. 3, the splicers or grips 11b, 11c are somewhat modified from the form shown in FIG. 1. Thus, casing 47 is truncated at one end 48, rather than being approximately symmetrical. At the truncated end 48 no jaws are required to grip the short cable 46, the inner end 49 of which is splayed by unwinding or other convenient means so that once inserted inside casing 47 it is retained therein against a pulling force. Core 21b is gripped by jaws 28b in manner similar to the modification of FIG. 1. Spring 51 bears at one end against core end 49 and at the opposite end against cup 52 which bears against the ends of jaws 28b, biasing same into initial engagement with core 21b. Core 21c of conductor 12c is gripped by a similar splice 11c which may be substantially identical with splice 11b, the corresponding parts being given the same reference numerals, followed by subscript c.

The stocking grip 41b is similar to grip 41, but is elongated to enclose splices 11b and 11c as well as connector cable 46. Reference numerals followed by subscript b are applied to corresponding element of grip 41b.

Although the foregoing invention has been described in some detail, by way of illustration and example for purposes of clarity of understanding it is understood that certain changes and modifications may be practiced within the spirit of the invention and scope of the appended claims.

What is claimed is:

1. Means for connecting together first and second conductors each having, respectively, first and second wire rope cores and first and second pluralities of conductive rods surrounding said respective cores comprising, first splicing means splicing together said cores to restrain said cores from pulling away from each other and having a hollow casing having an inner wall converging toward either end, first jaws bearing against said inner wall at one end and shaped when closed to grip said first wire core, second jaws bearing against said inner wall at the end opposite said first jaws and shaped when closed to grip said second wire core, means biasing said sets of jaws into engagement with their respective cores, and second splicing means gripping the exterior of said casing and also the exterior of said first and second pluralities of conductive rods of said first and second conductors transmitting a part of the pulling tension from said one conductor to the other said conductor independently of said cores, said second splicing means bridging across from said first conductor to said second conductor.

2. Means for connecting together first and second conductors each having, respectively, first and second wire rope cores and first and second pluralities of conductive rods surrounding said respective cores comprising, first splicing means, second splicing means, flexible means interconnecting said first and second splicing means and third splicing means, said first and second splicing means each having a hollow casing having an inner wall converging toward either end, first jaws bearing against said inner wall at one end and shaped when closed to grip one of said wire cores, second jaws bearing against said inner wall at the end opposite said first jaws and shaped when closed to grip said flexible means, means biasing said sets of jaws into engagement with their respective cores, said flexible means comprising a section of wire rope, said third splicing means comprising a stocking grip gripping the outside surfaces of said first and second pluralities of said conductive rods of said first and second conductors and also gripping the outside of said hollow casings of said first and second splicing means transmitting a part of the pulling tension from one said conductor to the other said conductor independently of said cores.

References Cited in the file of this patent
UNITED STATES PATENTS

| | | |
|---|---|---|
| 2,093,838 | Kellems | Sept. 21, 1937 |
| 2,158,892 | Becker et al. | May 16, 1939 |
| 2,434,358 | Frank | Jan. 13, 1948 |